Figure 4:
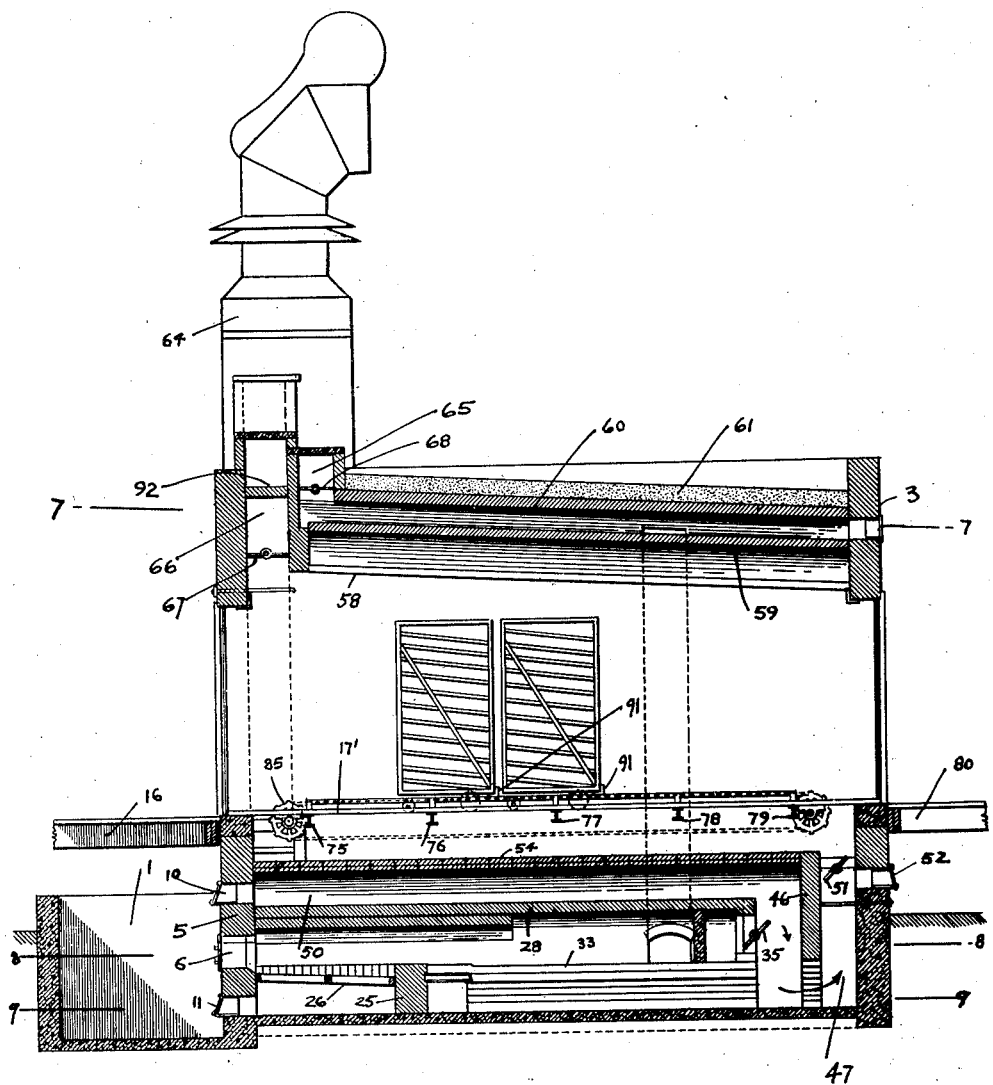

W. F. SCHALLER.
DRIER.
APPLICATION FILED SEPT. 11, 1918.
1,373,767.
Patented Apr. 5, 1921.
5 SHEETS—SHEET 1.
FIG. 1.
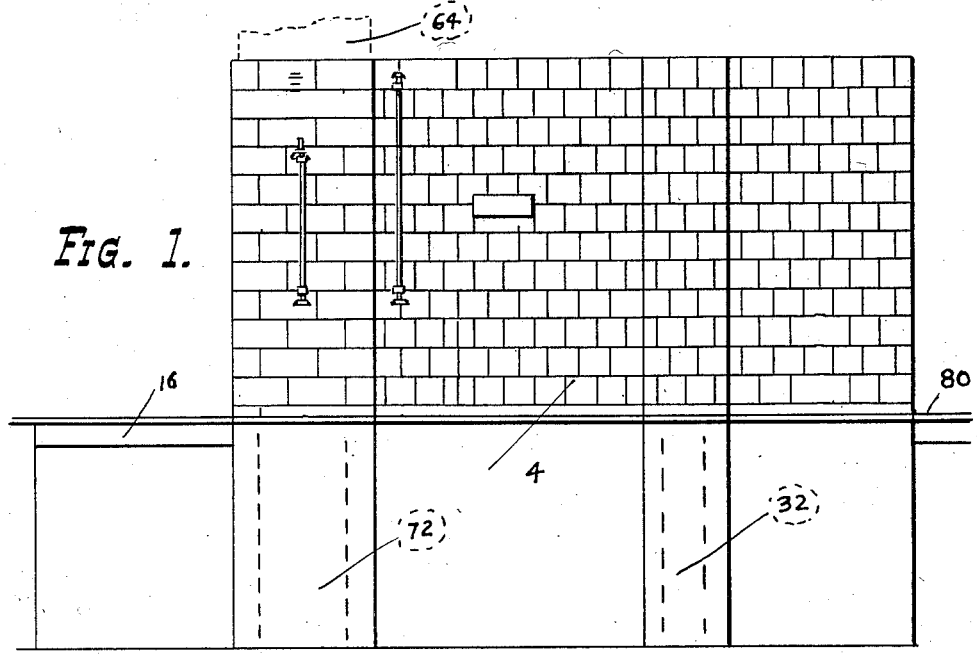
FIG. 2.
FIG. 3.
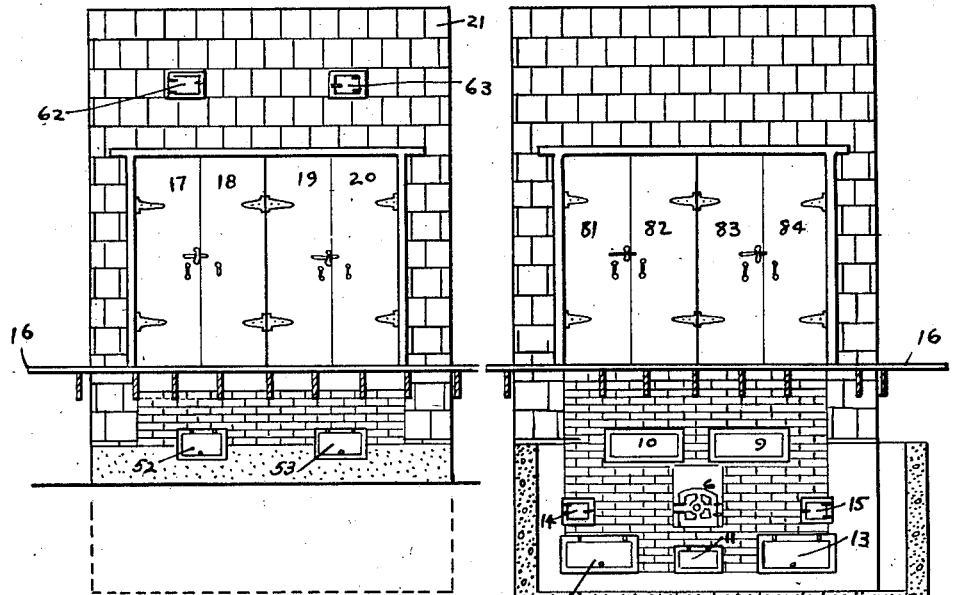
INVENTOR
W. F. SCHALLER
BY
Carlos P. Griffin
ATTORNEY

W. F. SCHALLER.
DRIER.
APPLICATION FILED SEPT. 11, 1918.

1,373,767.

Patented Apr. 5, 1921.
5 SHEETS—SHEET 4.

INVENTOR
W. F. SCHALLER
BY
Carlos P. Griffin
ATTORNEY

W. F. SCHALLER.
DRIER.
APPLICATION FILED SEPT. 11, 1918.
1,373,767.
Patented Apr. 5, 1921.
5 SHEETS—SHEET 5.
FIG. 8.
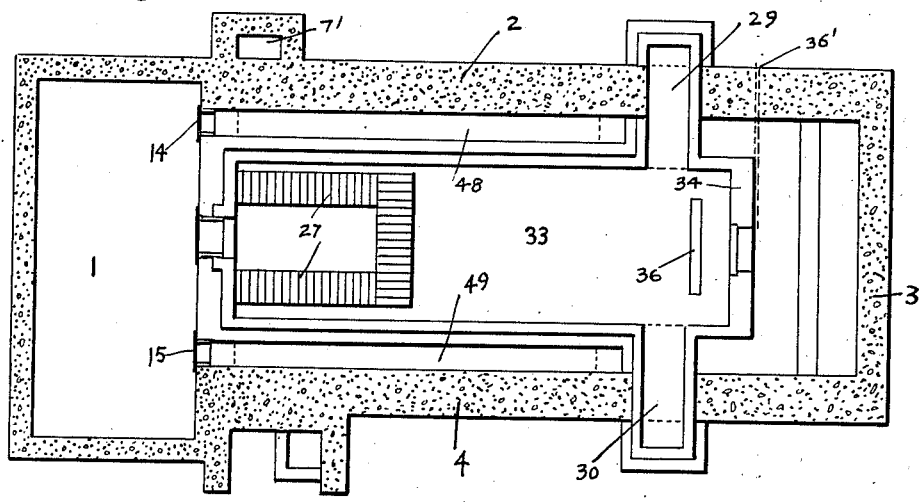
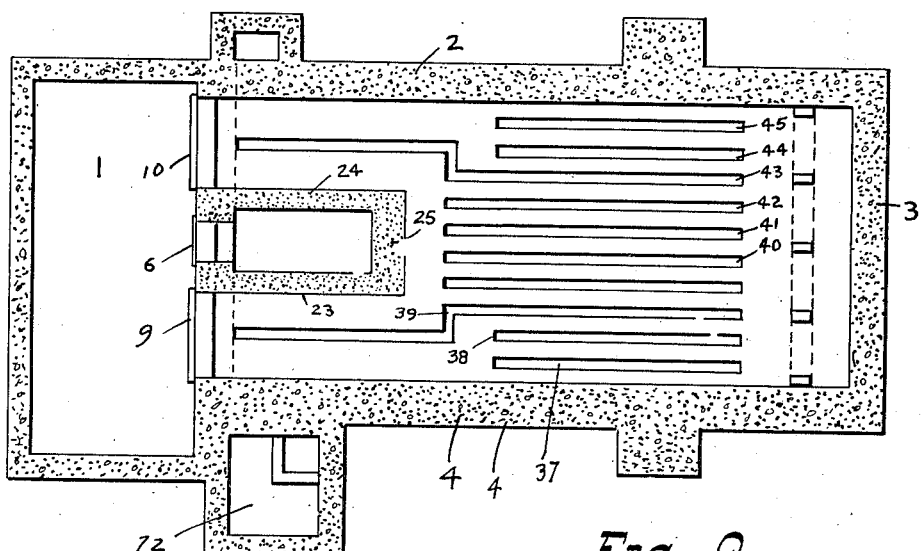
FIG. 9.
INVENTOR
W. F. SCHALLER
BY
Carlos P. Griffin
ATTORNEY

UNITED STATES PATENT OFFICE.

WILLIAM F. SCHALLER, OF SAN FRANCISCO, CALIFORNIA, ASSIGNOR OF ONE-THIRD TO ELLSIE SCHALLER AND ONE-THIRD TO IRMA HELEN SCHALLER, BOTH OF SAN FRANCISCO, CALIFORNIA.

DRIER.

1,373,767.    Specification of Letters Patent.    Patented Apr. 5, 1921.

Application filed September 11, 1918. Serial No. 253,628.

*To all whom it may concern:*

Be it known that I, WILLIAM F. SCHALLER, a citizen of the United States, residing at San Francisco, in the county of San Francisco, State of California, have invented a new and useful Drier, of which the following is a specification, in such full and clear terms as will enable those skilled in the art to construct and use the same.

This invention relates to a drier and its object is to provide means whereby the drying of fruit or other substances may be effectively carried out. An object of the invention is to provide a drying chamber which will be provided with a series of passages which will retain the heat as far as possible, and thereby efficiently dry the products placed within the drying chamber.

Another object of the invention is to produce a drier which will so far as possible prevent the disintegration or production of chemical changes in the products being evaporated.

Another object of the invention is to provide such an arrangement of flues and heating chambers as will thoroughly distribute and equalize the heat delivered to the drying chamber.

Another object of the invention is to provide means whereby the heated air may be mixed with an additional quantity of cool air in such a proportion as will prevent the overheating of the air used in the drying chamber.

Another object of the invention is to provide means for efficiently heating the drying chamber around four sides thereof, as well as supplying heat to air which passes through the drier.

Another object of the invention is to provide a damper to permit the quick heating of the drier by the passage therethrough of the products of combustion, when substances not likely to be injured by a high heat are being dried.

Other objects of the invention will appear as the description proceeds.

An embodiment of the invention is shown in the drawings in which the same reference numeral is applied to the same portion throughout, but I am aware that there may be modifications thereof.

Figure 5:
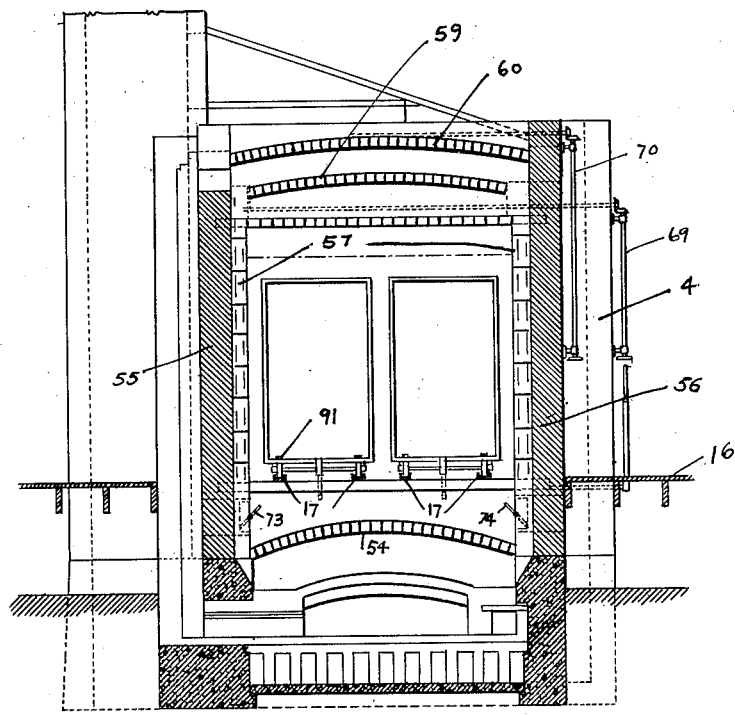
Figure 6:
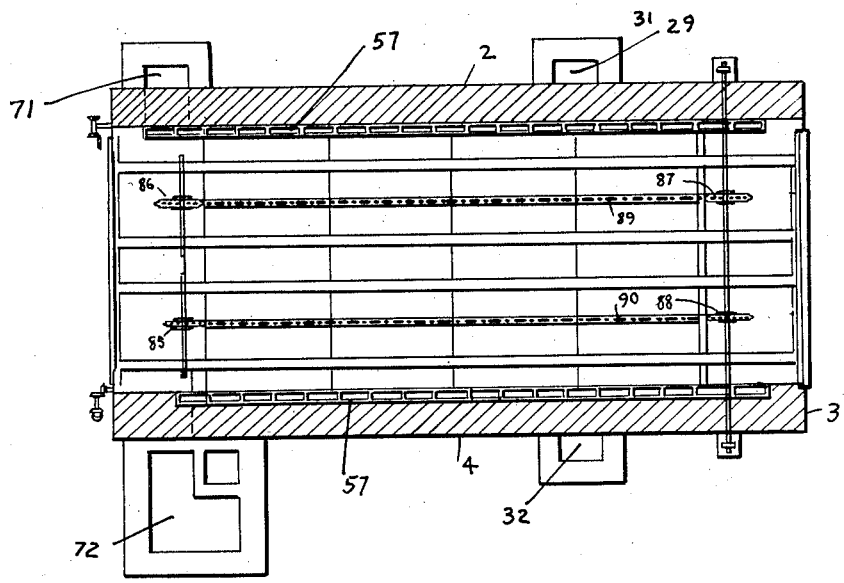
Figure 7:
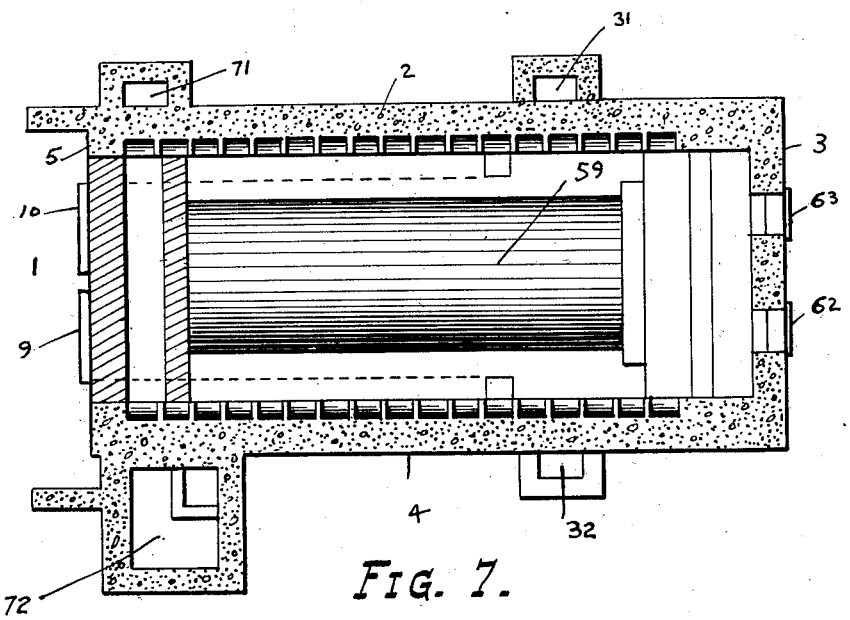

Figure 1 is a side elevation of the complete drier with its cowl chimney removed, Fig. 2 is a rear elevation of the drier, Fig. 3 is an elevation of the drier at the firing end, Fig. 4 is a longitudinal sectional view of the drier, Fig. 5 is a transverse sectional view of the drier, Fig. 6 is a horizontal sectional view of the drier, showing the chains for moving the cars through the drying chamber, Fig. 7 is a sectional view of the drier on the line 7—7, Fig. 4, showing the upper smoke arch, Fig. 8 is a horizontal sectional view of the drier on the dotted line 8—8, Fig. 4, and Fig. 9 is a horizontal sectional view of the drier on the line 9—9, Fig. 4.

The numeral 1 indicates a firing pit and around which the walls 2, 3 and 4 extend in a rectangular form to produce the foundation for the drier, as well as the chamber for the fire box and for the air flues below the floor of the drying chamber. Immediately adjacent the pit 1, is a transverse fire wall 5, which fire wall has the fire door 6, and two upper air doors 9 and 10 therein. Below the fire door there is an air door 11 for supplying air to the fire; and at the sides of the door 11 there are two other doors 12 and 13 which admit air to the flues below the fire box for circulation, in a manner later to be explained. Also above the doors 12 and 13, there are two other air doors 14 and 15.

A platform 16 extends above the pit 1 on a level with the tracks 17' within the drying chamber, in order to permit the cars of fruits or vegetables being dried to be discharged from the drier readily.

The doors 17, 18, 19 and 20, two of which are as wide as one of the cars, close the front wall 21 of the drier and permit the substances being dried to be removed from the drier at will.

Extending in a rectangle at the back of the fire door are three walls 23, 24 and 25, the latter of which extends only a short distance above the grate bars 26, around which grate bars are a series of fire brick as illustrated at 27, in Fig. 8, The walls 23 and 24 extend up to the arch 28 and said arch extends rearwardly from the fire box to the two cross flues 29 and 30, which flues are in turn connected with two vertical flues 31 and 32 respectively.

At the rear of the fire box there is a tiled or brick floor 33 over which the flames pass, and at the extreme rear of the fire box, it is closed in by a wall 34 which has a damper 35, in front of which is a baffle plate 36, the object being to prevent direct flames from striking the damper, and to as far as possible prevent dust or cinders from passing into the drying chamber if the damper 35 is open. The damper 35 is operated by means of a rod 36' extending through the side wall 2.

The floor 33 is supported upon a plurality of brick or tiled partitions 37 to 45 inclusive, which form means whereby heat may be transferred from the fire box to the incoming air, said partitions also forming flues whereby air may pass to the drying chamber through the doors 12 and 13 in such quantity as may be desired.

Immediately at the back of the fire box structure there is a wall 46 which has a series of openings at its lower edge to permit the heated air to pass into the flue 47 and directly into the drying chamber. The doors 14 and 15 lead into flues 48 and 49 which also deliver air to the drying chamber; and the doors 9 and 10 lead into a flue 50 over the fire box which also leads into the drying chamber.

The flue 47 has a damper 51 to regulate the quantity of air passing therethrough, and at the back of the door, there are two cold air doors 52 and 53 to reduce the temperature of the air delivered to the drying chamber whenever necessary.

Over the flue 50 there is an arch 54, and in the walls of the drier, 55 and 56, extending upwardly from said arch and from the foundation walls, there are a series of recesses to receive the hollow tiling 57, which tiling extends in said walls as high as the ceiling 58 over the drying chamber. Above the ceiling 58 there is an arch 59, so that the hollow tiling, and flue 50 together with the space between the ceiling 58 and arch 29 of the closed chamber form an inclosure for the retention of the heat and circulation of heat around the drying chamber.

Above the arch 59 is another arch 60 which is covered with any suitable insulating material 61. The flues 31 and 32 from the fire box, discharge directly into the space between the two arches 59 and 60.

In order to provide for cleaning the space between the arches 59 and 60 there are two doors 62 and 63 at the back of the drier. At the front end of the drier there is a cowl chimney 64, forming no part of the present invention, into which the transverse flues 65 and 66 lead, said flues being controlled by means of the dampers 67 and 68, which dampers have operating handles 69 and 70 outside the walls of the drier. The transverse flue 66 leads into two vertical flues 71 and 72 which flues extend to the foundation walls and which at their lower ends are controlled by means of the dampers 73 and 74, said dampers being operated manually by any suitable means. These are called the lower vapor dampers.

The rails 17' are four in number and are supported upon cross bars 75 to 79 inclusive at the height of the platform 16 and the platform 80, from which the cars are pushed into the drying chamber. The cars are pushed into the drying chamber through the doors 17, 18, 19 and 20; and the cars are discharged from the drier through the doors 81, 82, 83 and 84 at the opposite end thereof.

The rails 17' support four sprocket wheels 85 to 88 inclusive, which sprocket wheels carry chains 89 and 90, and which chains have flights 91 connected therewith so that they will carry the cars through the drier at such a rate of speed as it may be deemed desirable to operate the chains.

The shaft carrying the sprockets 87 and 88 projects through the side wall of the drier and is connected with any suitable source of power to drive it.

The ventilation flue 66 has a tiled baffle wall 92 therein to prevent the production of too great a draft through the dry chamber when the damper 67 is opened.

In operation, the cars are run into the drier, and a fire is built in the fire box, whereupon the products of combustion will ordinarily pass up the flues 31 and 32, and out from the flue 65 to the chimney. The heat from the fire box will heat the space above the arch 28 and will heat the walls at the sides of the drying chamber by reason of the hot air passing up through the hollow tiling 57. The draft caused by the smoke escape from the chimney will cause a suction of air in the flue 66. Additional air will be drawn through the doors 12, 13, 14, 15, 9 and 10 or 52 and 53, as they may be regulated by the operator. It is to be observed that all of the incoming air will either be heated by the fire box or will be thoroughly mixed with heated air.

Having thus described my invention, what I claim as new and desire to secure by Letters Patent of the United States, is as follows, express reservation being made of permissible modifications.

1. In an apparatus of the class described, a drying chamber having an air heating chamber surrounding three walls of the dry chamber, a fire chamber below the air chamber, flues for discharging the products of combustion, flues for heating the air, a downwardly extending flue at one end of the dry chamber into which the heated air passes and an escape flue at the upper portion at the opposite end of the dry chamber.

2. In an apparatus of the class described, a drier having a hot air chamber surrounding three walls of the dry chamber, a fire chamber below the air chamber, flues leading from the fire chamber for the products of combustion flues for supplying fresh air to the dry chamber and for heating it, a downwardly extending flue at one end of the dry chamber with an opening thereinto at the lower portion thereof for mixing the incoming air prior to its passage into the dry chamber, and a flue at the opposite end of the dry chamber for the escape of the heated air.

3. In an apparatus of the class described, a dry chamber, an air heating chamber surrounding three walls of the dry chamber, a fire chamber having flues above and below said air heating chamber, flues connecting said fire chambers with flues for heating fresh air and for delivering it to the dry chamber, and hot air discharge flues at the opposite end of the dry chamber having openings thereinto at the bottom and the top of said dry chamber.

4. In an apparatus of the class described, a dry chamber having a hot air chamber surrounding three walls of the dry chamber, a fire chamber having flues above and below the hot air chamber, flues connecting the fire chamber with flues below the lowest fire chamber for heating the air and delivering it to the dry chamber, a downwardly extending flue at the back of the dry chamber with openings thereinto at the lower portion thereof for mixing the fresh air and heated air, flues at the opposite end of the dry chamber for the escape of the air after passing into said dry chamber, and dampers for regulating the passage of air into and out of the drier.

5. In an apparatus of the class described, a dry chamber, means therein to move a series of cars therethrough, doors at the opposite ends of the dry chamber, an air heating chamber above and below the dry chamber, a fire chamber having flues above and below the air heating chamber, flues connecting the two fire chambers, flues below the fire chamber for heating the incoming fresh air, and dampers for regulating the discharge of air from and passage of air into the dry chamber.

In testimony whereof I have hereunto set my hand this 29th day of August A. D. 1918.

WILLIAM F. SCHALLER.